United States Patent [19]

Matsuda et al.

[11] 4,237,996
[45] Dec. 9, 1980

[54] MOTORCYCLE ENGINE MOUNTING STRUCTURE

[75] Inventors: Minoru Matsuda, Chofu; Mitsuo Nakagawa, Kawagoe; Tsuneaki Arakawa, Tokyo, all of Japan

[73] Assignee: Honde Giken Kogyo Kabushiki Kaisha, Tokyo, Japan

[21] Appl. No.: 948,394

[22] Filed: Oct. 4, 1978

[30] Foreign Application Priority Data

Oct. 5, 1977 [JP] Japan ................................ 52-119756
Feb. 20, 1978 [JP] Japan ............................ 53-20560[U]

[51] Int. Cl.³ ...................... B62D 61/02; B60K 11/04
[52] U.S. Cl. .................................... 180/229; 180/291; D12/110
[58] Field of Search ............. 180/219, 229, 291, 54 A, 180/68 R; 280/281 R, 279; D12/110

[56] References Cited

U.S. PATENT DOCUMENTS

| 2,071,761 | 2/1937 | Nicholson | 180/33 B |
| 3,783,961 | 1/1974 | Hooper | 180/33 A |

FOREIGN PATENT DOCUMENTS

| 158495 | 6/1953 | Australia | 180/33 R |
| 246209 | 3/1926 | Italy | 280/281 R |
| 528676 | 2/1955 | Italy | 280/281 R |
| 312018 | 1/1953 | Switzerland | 180/33 A |

OTHER PUBLICATIONS

The Honda Owner, Spring 1975.
850 Guzzi Eldorado, 2/9/74.

*Primary Examiner*—John P. Silverstrim
*Attorney, Agent, or Firm*—Irving M. Weiner; Pamela S. Burt; John L. Shortley

[57] ABSTRACT

A motorcycle engine mounting structure having a head tube (23), a main frame pipe (21) extended rearwardly from the head tube, and an engine (60). In order to increase the freedom of design for mounting an engine and to ensure a radiator mounting space, a pair of supporting members (40, 50; 240, 250) are suspended from the front part of the main frame (21), and the engine (60) is supported in the front part through the supporting members.

14 Claims, 17 Drawing Figures

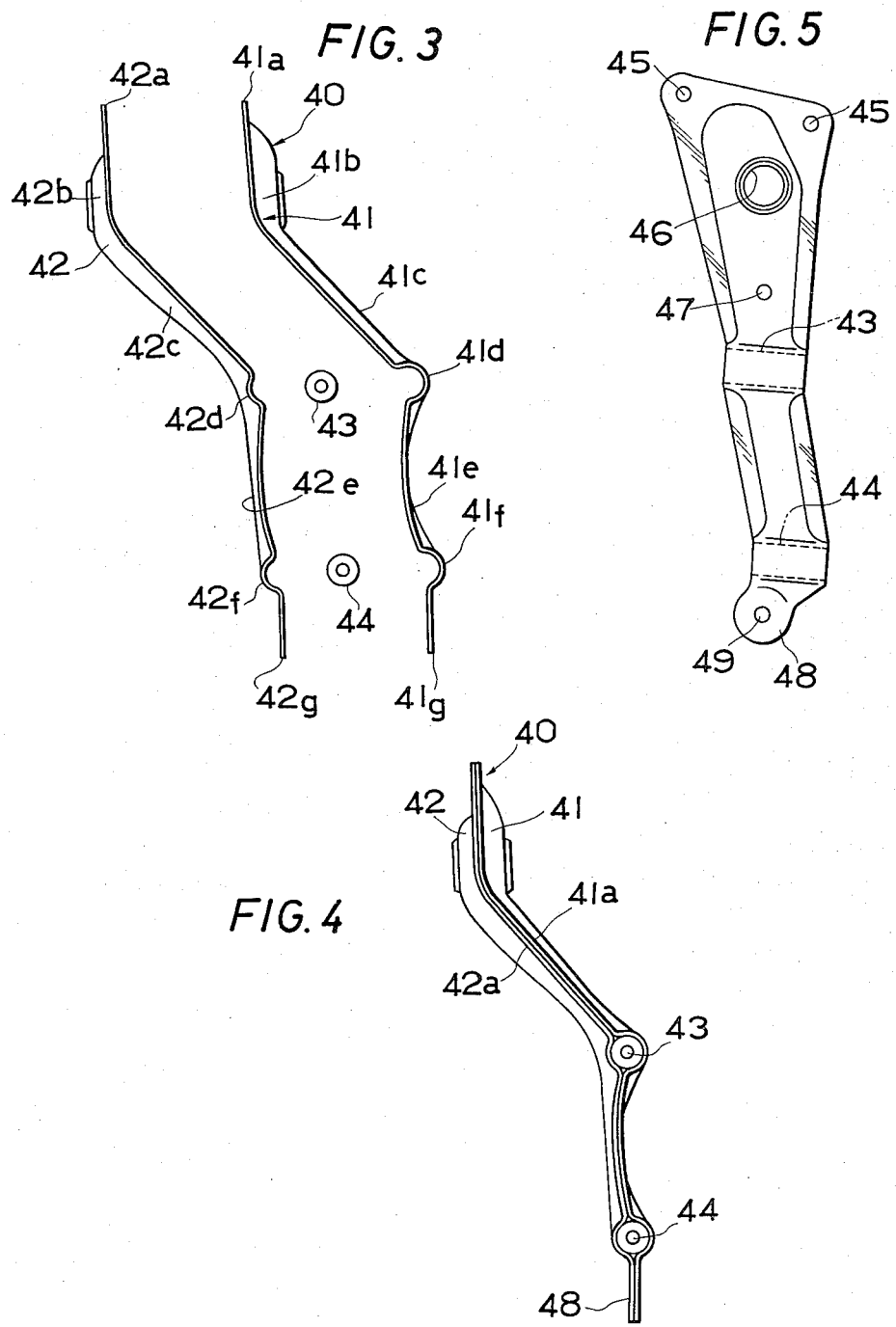

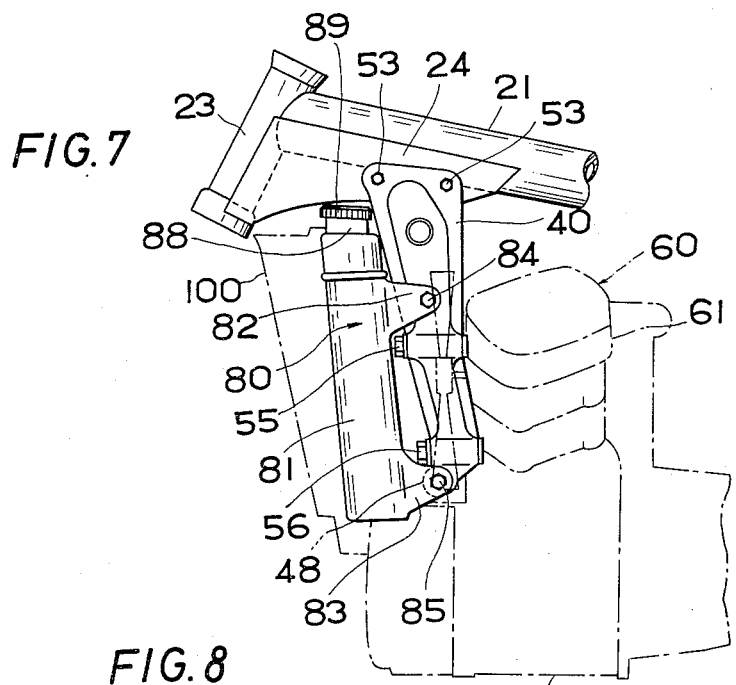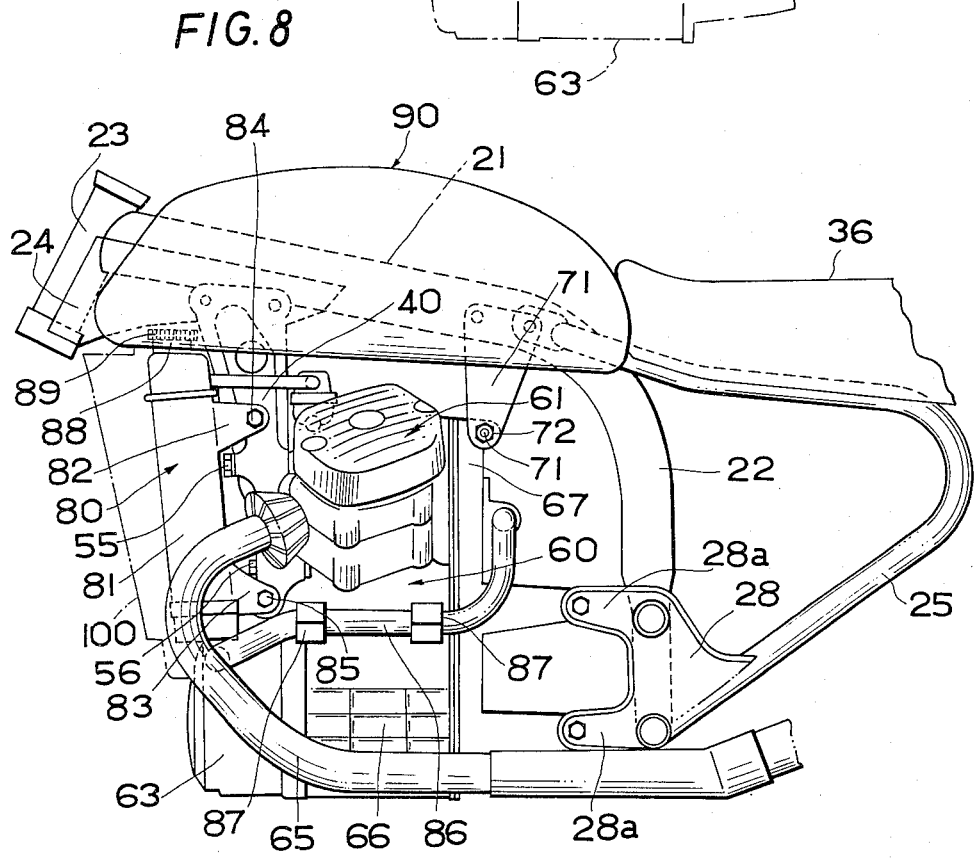

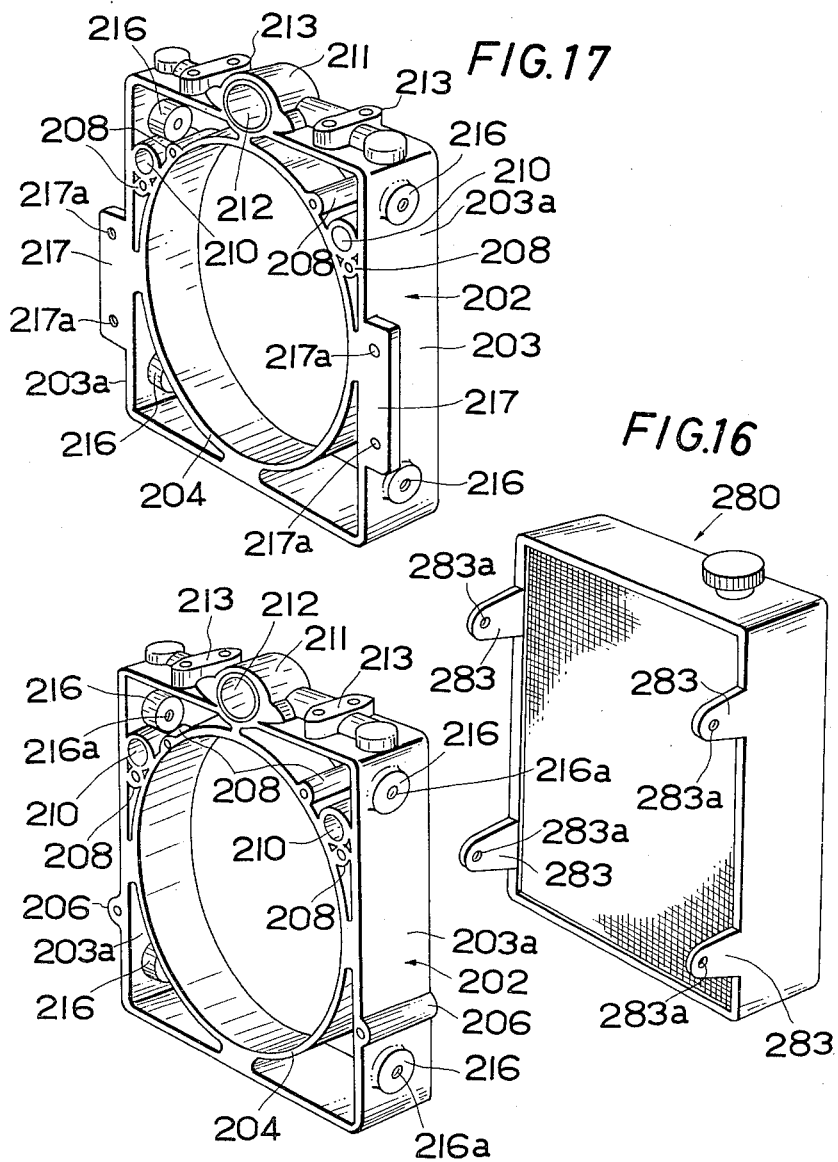

MOTORCYCLE ENGINE MOUNTING STRUCTURE

BACKGROUND OF THE INVENTION

1. Field of the Invention

The present invention relates to improvements in a structure for mounting and supporting a motorcycle engine on a frame. In particular, the invention relates to a motorcycle engine mounting structure by which a mounting space for the engine and freedom of design for mounting the engine is increased so that a mounting space for a radiator in a water-cooled engine may be satisfactorily ensured.

2. Description of the Prior Art

Various types of structure for mounting and supporting motorcycle engines have already been adopted.

A typical frame is provided with a front-down tube extended downwardly from a head tube and cooperating with a bracket member suspended on a middle part of the vehicle body to support a crankcase of an engine.

A cradle frame, instead of the above, is formed by connecting the above mentioned diamond frame in the lower part with a car body member and an engine is mounted and supported on the car body member connected to the downward tube.

Further, a type called a backbone frame is provided with a backbone formed of a single member extended rearwardly from a head tube. This type is used mostly for a small motorized cycle, such as a moped.

In fact, various kinds of structure for mounting and supporting an engine on a frame have been put into practice to date, but they substantially comprise improvements based on any of the above mentioned structures.

However, there have been tendencies to increase the volume of the motorcycle engine and to provide a water-cooled engine for motorcycles with such increased volume. Under these circumstances, the typical conventional frame structure mentioned above for mounting and supporting the engine has problems such as described hereinafter.

When the engine is made larger, according to the conventional frame such as the diamond type or cradle type frame wherein the front down tube is suspended or is extended rearwardly to form an enclosed space, the frame component members impose restrictions on the mounting of the engine and the width is also restricted with respect to the sitting position of the rider. It is a very difficult matter of design to mount the engine in the limited space in the front part of the frame in view of the down tube and the loop-shaped rearwardly extended member integral with the down tube. Also, when installing the engine, placement of a large engine in the down tube frame or the loop-shaped frame and connecting it with the frame therearound is difficult and complicated.

In order to solve such problems, it has been necessary to design the engine in conformity with the frame structure or taking into account the mounting workability. Thereby, the arrangements of the crankcase, transmission case and cylinder have been influenced and the engine design and power transmitting mechanism is likely to be complicated. In particular, in case a cradle type frame structure and a multi-cylinder engine are adopted, rearward extension of the exhaust pipe will be restricted by the frame and therefore a design having adverse effects on the engine performance, such as the unreasonable curving of the exhaust pipe, will have to be made.

On the other hand, with the increase of the swept volume, a water-cooled engine tends to be adopted. In such case, the cooling means for cooling water, i.e., the radiator, is arranged in the rear of the front wheel but in front of the engine. However, with the conventional type frame structure, because the down tubes are present in front of the engine, the radiator fitting space is restricted and is likely to interfere with the front wheel located in front of the radiator or with the bridge which is a turning member for steering, and also a front fork supporting member. For these reasons, it has been rather difficult to arrange the radiator and, for the arrangement of the radiator, the capacity of the radiator has had to be made as small as possible.

Further, if the radiator is set in an upper position in front of the down tubes, the steering angle will be restricted. In order to avoid this problem, the radiator must be set in the middle height or in a position somewhat lower than it. As a result, the front wheel and fender will be positioned in front of the radiator and the cooling efficiency of the cooling water will be reduced. In that case, if a cooling fan is provided in order to improve it, the space occupied by the radiator will become so large as to present a problem with respect again to the fitting space of the engine. Further, if a radiator cover is expanded sideward on the right and left so as to guide and concentrate air in the radiator, the design of the front part of the engine will become a problem. Particularly, in the motorcycle wherein the engine and radiator are exposed nakedly, the designs thereof are important and such attempt is thus undesirable.

The present invention effectively solves these problems associated with conventional structures for mounting and supporting the engine when the engine is made larger, and the structures for arranging the radiator when a water-cooled engine is adopted.

SUMMARY OF THE INVENTION

An object of the present invention is therefore to provide a motorcycle engine mounting structure wherein a frame is formed of a single main frame member extended rearwardly from a head tube, a pair of supporting members are suspended from the front part of the main frame spaced apart from each other in the rightward and leftward directions, and an engine is supported in the front part through the supporting members.

Therefore, there is no need for a down tube or any other members extended downwardly from the head tube in the front part of the engine, so that a mounting space for an engine can be freely attained, while the strength and rigidity required and sufficient for practical use can be maintained by the pair of suspending members.

Another object of the present invention is to provide an engine mounting structure wherein a V-shaped vertical multi-cylinder engine is supported in the cylinder part on the right and left sides by the pair of suspending members so that the V-shaped engine can be easily mounted and supported while ensuring high mounting workability, advantageous space provision, and that the exhaust pipe of each cylinder can be led and extended out naturally.

Another important object of the present invention is to provide an engine mounting structure wherein an engine is a water-cooled engine and a radiator is arranged in front of the engine and supported by the suspending members in common with the engine.

Therefore, a space in the front of the engine can be effectively utilized as a space for arranging the radiator and, because the radiator is supported by the engine suspending members, there are advantages such as that the parts can be minimized and can be used in common and that the mounting work can be facilitated.

Further, because the down tube normally provided downwardly from the head tube is eliminated, a radiator of a large capacity can be arranged in an upper position as much as possible without influencing the steering performance, and thereby the influence of the front wheel and front fender on the radiator can be reduced and the cooling efficiency of the radiator can be elevated.

Still another object of the present invention is to provide an engine mounting structure wherein a cooling fan is provided in a space enclosed with the suspending members provided between the engine and radiator so that the space may be utilized effectively and the cooling fan may be favorably protected.

A further object of the present invention is to provide an engine mounting structure wherein the pouring port of the radiator is housed in a recess formed on the lower surface of a fuel tank provided to stride the frame so as to prevent the pouring port and its cap from being exposed, to avoid an accident which may occur by the spouting out of boiling water from the radiator, thereby improving the safety of the motorcycle.

A still further object of the present invention is to provide an engine mounting structure wherein a square-shaped cooling fan case is supported by the suspending members, and the engine and radiator are supported on the front and rear on the square case, respectively.

Another object of the present invention is to provide an engine mounting structure wherein the square case is formed by die-casting an aluminun alloy or the like to provide thereon setting space for a cooling water path, a thermostat and other parts so that the space may be effectively utilized, the fitting of the various parts may be easily made, and the number of component parts may be minimized and the parts may be used in common.

The present invention is explained in detail below with reference to the accompanying drawings which illustrate preferred embodiments.

BRIEF DESCRIPTION OF THE DRAWINGS

FIG. 3 is a front exploded view of one of suspending members.

FIG. 4 is a front view of the same member as assembled.

FIG. 5 is a side view of the same member.

FIG. 7 is a side view showing the suspending member supporting a radiator and engine.

FIG. 8 is a side view of an essential part including the fuel tank which covers a radiator cap.

FIG. 16 is a perspective view of a modified embodiment of the square-shaped fan case and the radiator.

FIG. 17 shows a further modified embodiment of the square-shaped fan case.

DETAILED DESCRIPTION OF THE PREFERRED EMBODIMENTS

Figure 1:
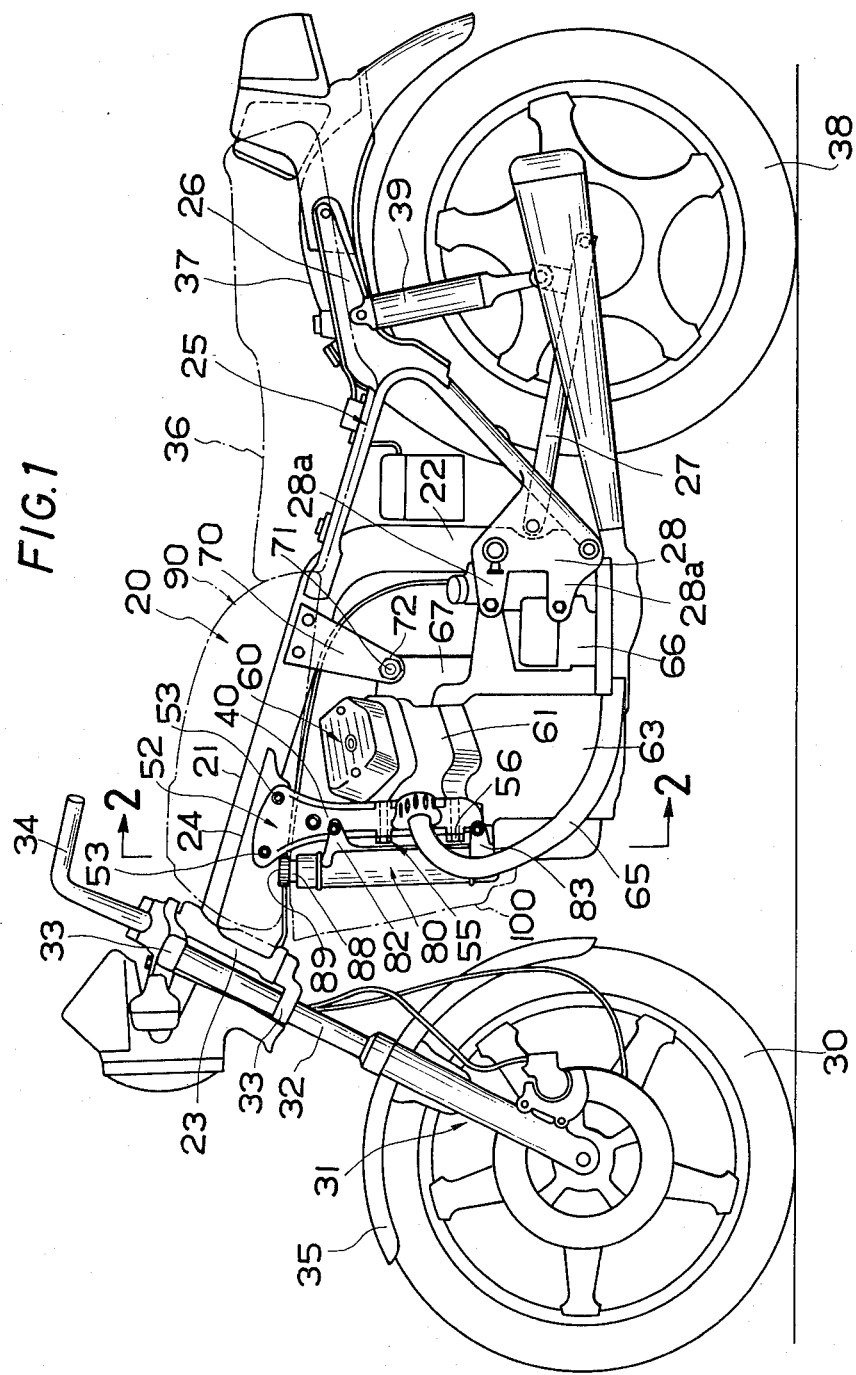
FIG. 1 is a schematic side view of a motorcycle, showing an essential part of the present invention.

Referring to FIG. 1, a motorcycle body frame 20 comprises a main frame pipe 21 formed of a comparatively thick steel material and having a large diameter to form a backbone frame. The pipe 21 is connected at the front end thereof to the rear surface of a head tube 23 by welding or the like, is extended rearwardly from the head tube 23 and is bent downwardly vertically in the rear part to form a center pillar 22. A substantially triangular reinforcing joint plate 24 is provided between the head tube 23 and the front part of the main frame pipe 21 and is welded at a front end to a side of the head tube 23 and at an upper end to the side of the pipe 21 so as to enhance the connecting strength between the pipe and head tube 23. The plate 24 has some length in the forward and rearward directions, is suspended downwardly at a proper length and is provided on the right and left of the head tube 23 and pipe 21.

Upper and lower bridges 33 are supported on a steering stem (not illustrated) which is put through the head tube 23. Fork pipes 32 of a front fork 31 are supported by the bridges 33. A front wheel 30 is supported by the front fork 31. A steering handle bar 34 is securely provided on the top bridge. A front fender 35 is provided above the front wheel.

A sub-frame 25 shaped by being bent to be substantially V-shaped on the side is connected by welding or the like at both ends to the upper and lower ends of the pillar 22. The sub-frame 25 is provided on each of the right and left sides of the pillar 22. A supporting member 26 is securely provided in the rear end of each sub-frame 25. A seat 36 and a rear fender 37 are supported by the sub-frames 25 and supporting member 26. A rear fork 27 is pivoted at the front end thereof proximal to the lower end of the pillar 22. An axle of a rear wheel 38 is supported at the rear end of the rear fork 27. A rear cushion or shock absorber unit 39 is connected between the rear part of the rear fork 27 and the supporting member 26 and is provided on each of the right and left sides.

FIGS. 3 to 5 show one of a pair of supporting plates which suspended and support an engine. The pair of supporting plates 40 and 50 having shapes symmetrical to each other are formed of press-shaped products of steel plate materials and are each assembled from two body halves 41 and 42 integrally jointed to each other by welding as shown, for example, in FIG. 3.

Body half 41 is made to extend vertically downward in the upper part 41b, is bent diagonally outward in the intermediate part 41c and is extended vertically downward again through part 41e to the lower end 41g. Recesses 41d and 41f are integrally provided on the inner side of the intermediate bent portion and the lower vertical portion of the half 41, respectively, in order to receive therein fastening members, such as bolts. The body half is swelled outwardly in the intermediate part in the width direction to elevate the strength and rigidity of the body half 41 and is made to be flat in the peripheral part to form a flange 41a which is adapted ot join with the other body half 42. The other half 42 is shaped to be of a shape conforming to the half 41 and is provided with a substantially vertical upper part 42b, a diagonally extending intermediate part 42c and a substantially vertical lower part 42e extended to 42g. Recesses 42d and 42f corresponding to the recesses 41d and 41f are provided on the outside of the half 42. Each of the halves 41 and 42 is integrally press-shaped out of one steel plate material.

The halves 41 and 42 are butted against each other at the flange 41a and 42a and are jointed by welding with each other on the end edges. In assembling steps, thick pipes 43 and 44 are inserted respectively between the recesses 41d and 42d and between the recesses 41f and 42f and are welded to the respective recesses. As clearly shown in FIG. 5, the thus obtained one supporting plate 40 has fitting holes 45 formed on the right and left in the upper flange part, a connecting hole 46 of a large diameter formed on the vertical upper parts 41b and 42b, another fitting hole 47 formed on the diagonal intermediate part 41c and 42c and a fitting hole 49 formed at the lower end 48 formed by the extended parts 41g and 42g.

The other supporting plate 50 is formed in the same manner but is symmetrical with the supporting plate 40.

Figure 2:
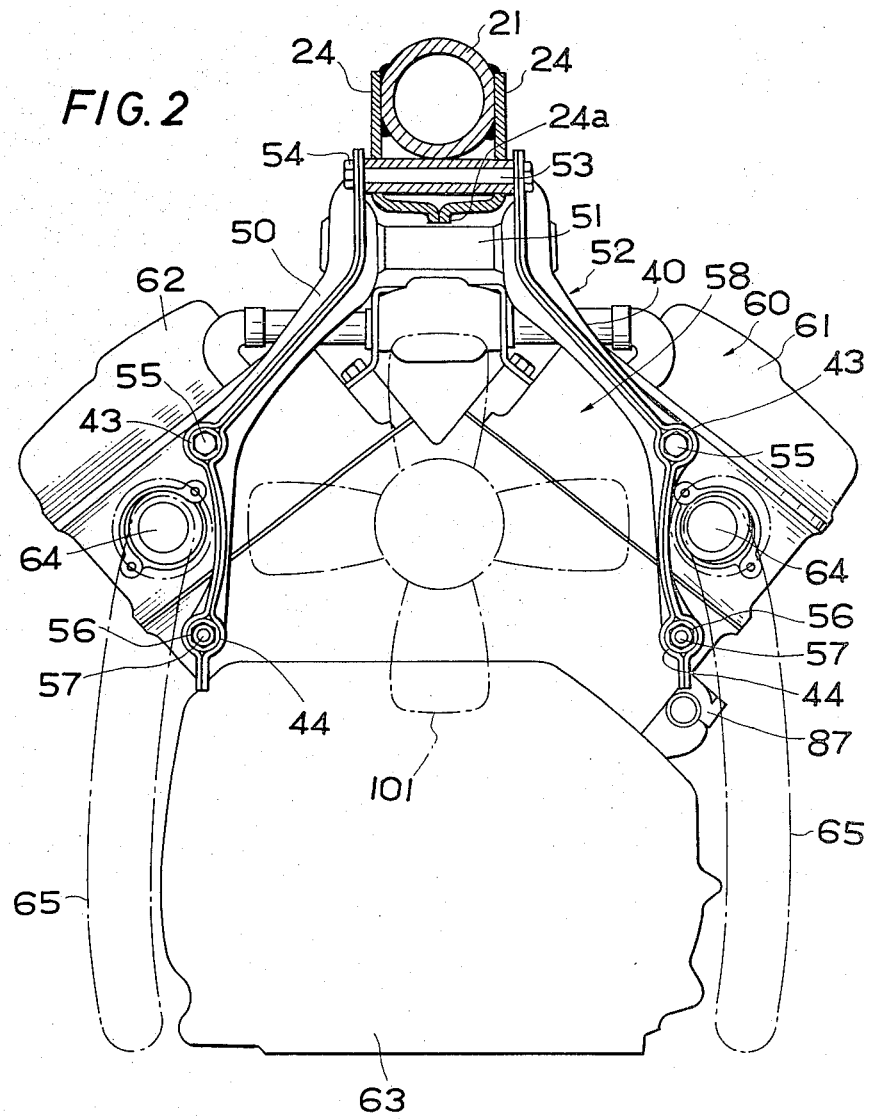
FIG. 2 is an enlarged sectional view on line 2—2 in FIG. 1, showing only a supported front part of an engine for the convenience of explanation, omitting the other parts.

The supporting plates 40 and 50 are arranged symmetrically to each other, a pipe spacer 51 which is also a cross-member is inserted in and put between the holes 46 provided in the upper parts 41b and 42b and is welded at both ends to the inner periphery of the holes 46 to form a unit 52 narrow between the upper parts, diagonally expanding toward both outsides in the intermediate parts and parallel in the lower parts as shown in FIG. 2.

The plates 40 and 50 of the unit 52 are provided to hold the outsides of the joint plates 24 between the upper flanges. Bolts 53 are put between the holes 45 at the upper ends of the plates 40 and 50 so as to pass through the right and left jointing plates 24 interposed therebetween and the plates are fastened and connected at the upper ends thereof to the plates 24 with nuts 54. Thus the supporting plates 40 and 50 are suspended in the front part of the main frame pipe 21. In order to enhance the lateral rigidity, the joint plates 24 are bent symmetrically inwardly in the lower parts and are jointed to each other in the butting parts 24a so as to be substantially U-shaped in cross-section as shown in FIG. 2. The plates 40 and 50 are thus fastened in two places along the pipe 21.

Figure 6:
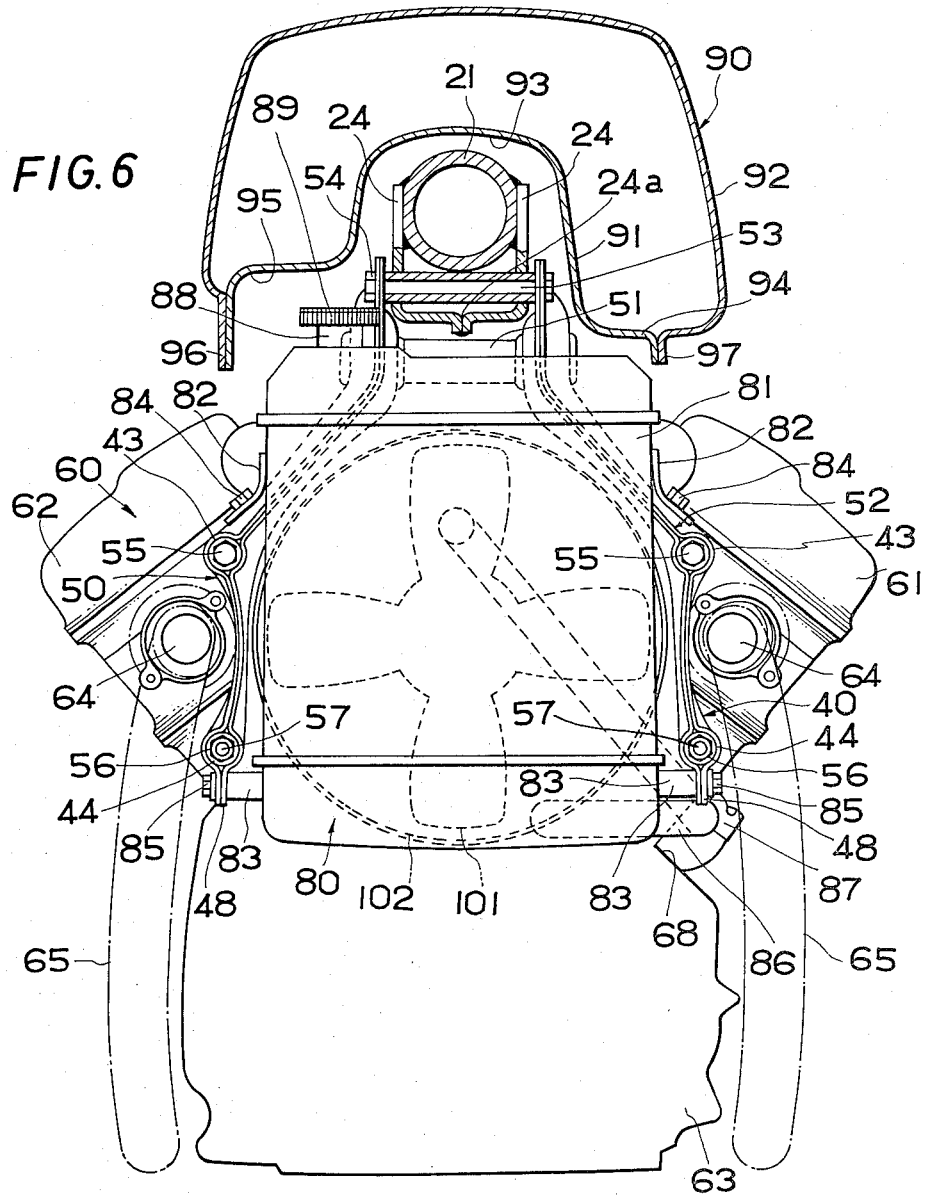
FIG. 6 is a view similar to FIG. 2, showing a mounted radiator, including the sectional view of a fuel tank.

Turning to FIG. 6, a V-shaped vertical multi-cylinder engine 60 is arranged between the supporting plates 40 and 50 and the pillar 22. The front surfaces of the cylinders 61 and 62 forming a V shape are positioned on the rear surfaces of the respective plates 40 and 50. Bolts 55 with nuts 56 are passed through the fitting pipes 43 and 44 provided in the intermediate parts and lower parts of the plates 40 and 50 to connect the cylinders 61 and 62 to the plates. In the illustrated embodiment, the bolts 55 are passed through pipes 43 and are screwed into screw holes (not illustrated) provided in the upper front parts of the cylinders 62 and 61. Stud bolts 57 provided in advance to project forwardly in the lower part of the front surface of the cylinders 61 and 62 are passed through the other fitting pipes 44 and are screw-fastened with nuts 56 so as to conveniently connect the engine 60 to the plates 40 and 50.

The engine 60 is thus suspended and supported at four points of the supporting plates 40 and 50 in the front parts of the cylinders 61 and 62 so that a crankcase 63 is positioned below the plates 40 and 50 and a sufficient space 58 (FIG. 2) is formed between the right and left supporting plates on the crankcase 63.

The exhaust ports 64 of the respective cylinders 61 and 62 are positioned outside the plates 40 and 50 and therefore the exhaust pipes 65 have no interfering members on both sides of the crankcase 63 and can be easily suspended downwardly and then extended rearwardly. As such, the exhaust pipes are not required to be shaped and arranged in a complicated structure and do not obstruct the engine performance.

Because the engine 60 is suspended and supported by the plates 40 and 50 spaced apart from each other on the right and left, the strength and rigidity of the engine support is enhanced and, even if the engine is a large type and of large weight, the strength and rigidity necessary and sufficient for practical use will be obtained. Because a down tube extended downwardly from the head tube or the vertically provided member corresponding to such a down tube of the conventional frame is eliminated, a large space below the main frame member is attained for mounting the engine. Therefore, freedom is provided in the layout of the front part of the engine, the mounting of the engine and the design of the engine. Further, because the actual incorporation of the engine is not interfered with by the down tube or the like, assembly is facilitated. Thus, the disadvantages in mounting the engine with the increase of the swept volume of the engine are simultaneously solved. Further, in a V-shaped engine such as mentioned above, the right and left cylinders are suspended and supported by the supporting plates to have such advantages as are mentioned above and, because the down tube or the like is eliminated, the extension of the exhaust pipe is not restricted and no special consideration in design and mounting is required. Further, as described above, because the exhaust pipe is not made in a complicated shape, there is also an advantage in that the engine performance can be well developed.

In the above illustrated embodiment, a V-shaped engine has been described, by way of example. However, the type of the engine is not thus restricted. The engine may be suspended and supported only by the supporting plates 40 and 50 on the right and left sides in the front part. Because the space between the plates 40 and 50 is free and there is no member around the crankcase, even three, four or more exhaust pipes can be easily arranged.

Referring again to FIG. 1, a transmission case 66 extended rearwardly of the crankcase 63 is positioned in front of the pillar pipe 22 of the main frame pipe 21 and is connected and supported at two points, upper and lower, on both sides to the extensions 28a extended forwardly from the reinforcing plates 28 by bolts or the like. The plates 28 are also extended rearwardly and are welded to the lower ends of the sub-frame 25 so as to be reinforcing members of the sub-frame 25.

Further, supporting plates 70 are suspended from both sides of the intermediate part of the main frame pipe 21. A part 67 provided in the rear of the engine 60 is held between the lower ends of the plates 70 and is fastened thereto by a bolt 71 and a nut 72. Thus the engine is supported by the main frame pipe 21 in the respective front, rear and intermediate parts.

The mounting of a radiator for the water-cooled engine is described below.

A radiator 80 is arranged in front of the engine 60 and is supported by the supporting plates 40 and 50 in common with the engine 60.

An elevational view of the radiator 80 supported in common with the engine 60 is shown in FIG. 6 and a side view thereof is shown in FIG. 7.

The radiator 80 is arranged in front of the supporting plates 40 and 50. A casing 81 of the radiator is provided with extensions 82 and 83 in the upper and lower parts of both side surfaces. The upper extensions 82 are extended rearwardly so as to be extended along the inclined intermediate parts 41c and 42c of the supporting plates 40 and 50, and are overlapped on the outer surfaces of the inclined parts. The holes 47 provided in the parts 41c and 42c in advance are applied to fitting holes provided in the extensions 82 which are fastened and connected to the plates 40 and 50 by bolts and nuts 84. The lower extensions 83 are also extended rearwardly and overlapped on the lower extended ends 48 of the plates 40 and 50. The holes 49 provided in the ends 48 in advance are applied to fitting holes provided in the extensions 83 which are fastened and connected to the supporting plates by bolts and nuts 85.

Because the plates 40 and 50, i.e., the unit 52, support the engine 60 in the front parts of the cylinders 61 and 62 the radiator 80 supported on the front side of the supporting unit 52 is also arranged in the upper position in front of the cylinders. Also, because the down tube or the like is eliminated, the radiator is provided as rearwardly as possible so as not to interfere with the steering part, such as the bridge. Because the supporting unit 52 is opened forwardly, the radiator 80 can be easily mounted. Further, the radiator 80 is supported by the plates 40 and 50 in common with the engine, and thus the fittings can be minimized and can be used in common.

A radiator hose 86 is extended rearwardly out of the lower end of a radiator body 81, is held by clamps 87 provided in a laterally directed V-shaped recess 68 formed by outer surfaces of cylinder 61 and the crankcase 63, and is connected to a pump (not illustrated).

A fuel tank 90 is provided to straddle the front part of the main frame pipe 21 so as to be able to be lifted at the front end and is provided with a hinge at the rear end (not illustrated).

As clearly shown in FIG. 6, the tank 90 comprises a jointed body of lower and upper body halves 91 and 92. The lower body half 91 is provided in the intermediate part in the width direction with a recess 93 for housing the main frame pipe 21 to which the jointing plates 24 are connected to suspend the plates 40 and 50. A water pouring port 88 closed with a cap 89 is provided to project upwardly out of an upper end of the radiator 80 and is positioned below the lower surface of a tank bottom 95 so as to be covered by an edge 96 which is extended downwardly the same distance as an edge 97 of the other bottom 94. Due to the edge 96, the cap 89 cannot be opened from the side of the tank. Therefore, unless the tank is lifted at the front end to expose the cap 89, the cap will not be able to be opened to pour in water. Thereby, an accident which might be caused by the jetting out of hot water at a time when the cap 89 is carelessly opened immediately after the engine stops can be prevented. The extension of the edges 96 and 97 are adapted to be used for a welding joint of the upper and lower body halves 92 and 91, respectively.

Referring to FIGS. 1, 7 and 8, the radiator 80 is covered on the periphery of the front side thereof with a cover 100. The thus covered radiator 80 is arranged so that the upper part of the front surface may be above the back side of the front wheel 30 and the fender 35 and the radiator 80 may well receive air currents on the front surface to obtain a high cooling efficiency.

The supporting unit 52 has the cylinders 61 and 62 on the rear sides, has the radiator 80 on the front sides and supports same simultaneously in common. A space 58 is defined on the right and left by the plates 40 and 50 and in the front and rear by the engine 60 and the radiator 80.

A cooling fan 101 (FIG. 2) attached to the radiator 80 is housed in the space 58, is connected to a driving shaft or the like extended forwardly out of the engine 60 and is driven by the engine power. The fan 101 is provided in the central part of the space 58 with a clearance large enough to prevent interference with the inside surface of the plates 40 and 50. A fan case 102 is provided between the insides of the supporting plates and the edge of the fan 101 and is made to be either a circular shape such as shown, for example, in FIG. 9, or any proper shape conforming to the shapes of the insides of the plates 40 and 50.

Figure 9:
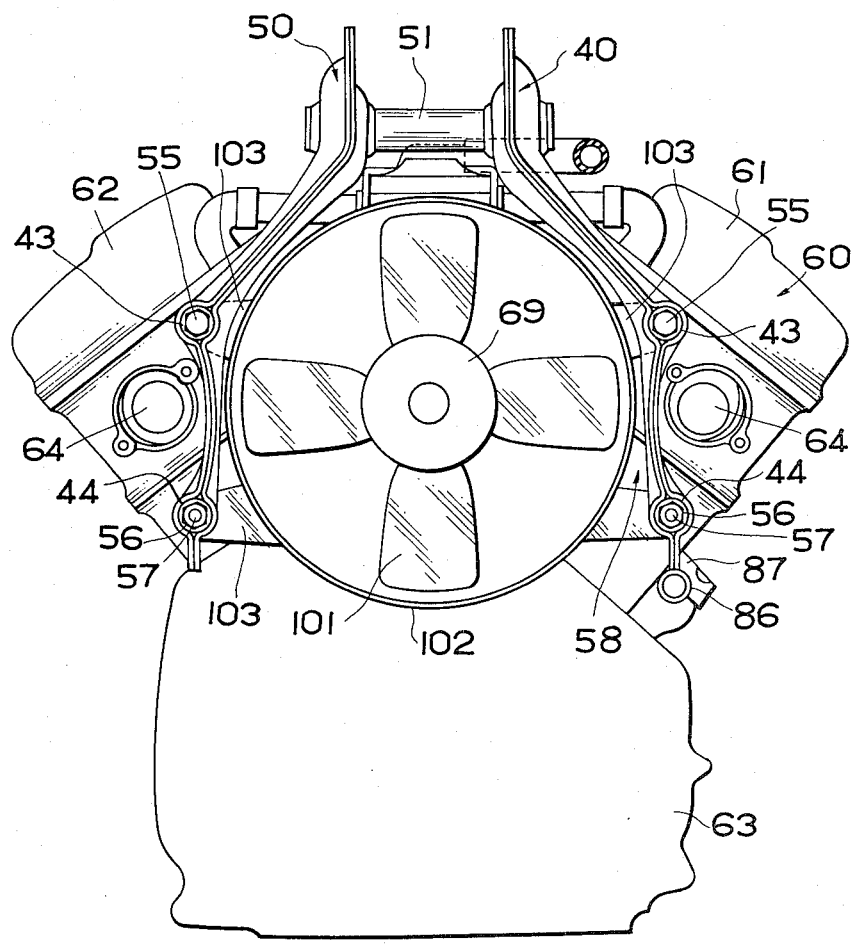
FIG. 9 is a view similar to FIG. 2, showing a cooling fan case.
Figure 10:
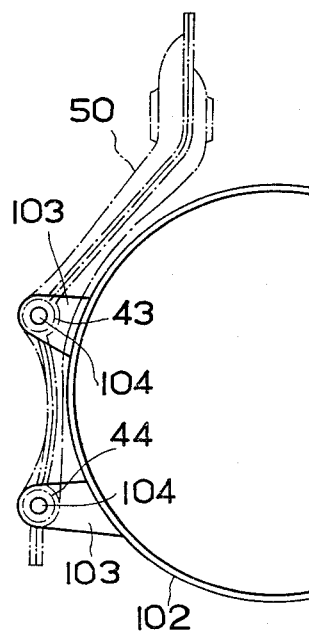
FIG. 10 is a view showing only a cooling fan case supported by the suspending member of FIGS. 3–5.

The fan case 102 is supported as follows. Referring to FIGS. 9 and 10, extensions 103 are integrally provided on both sides and from the upper and lower positions of the case 102. The bolts 55 and 57 connecting the supporting plates with the engine 60 are passed through holes 104 provided in the extensions 103 to connect the fan case to the supporting plates in common with the engine. Thus, the fan case 102 can be supported with the plates 40 and 50 without requiring any particular fitting members.

Figure 12:
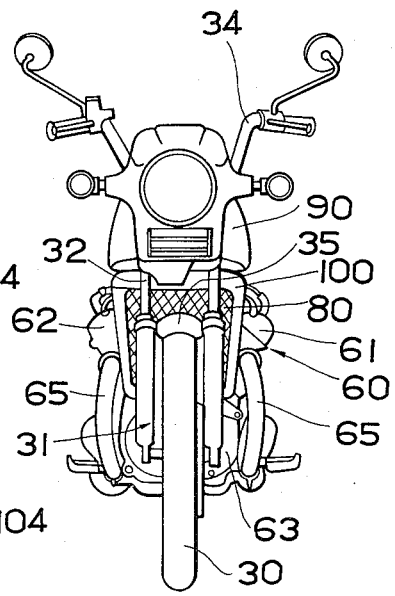
FIG. 12 is a front view of a motorcycle embodying the invention.
Figure 11:
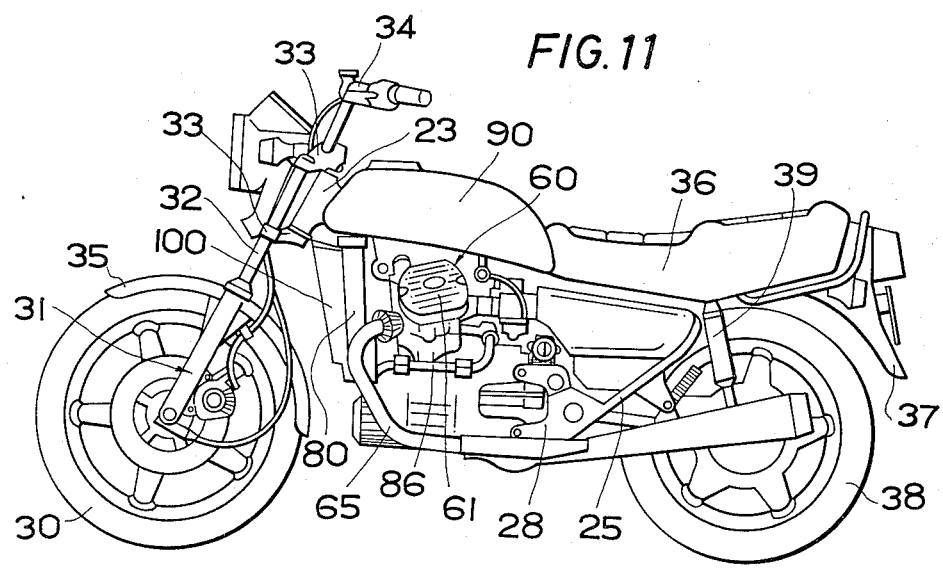
FIG. 11 is an entire side view of a motorcycle embodying the present invention.
Figure 13:
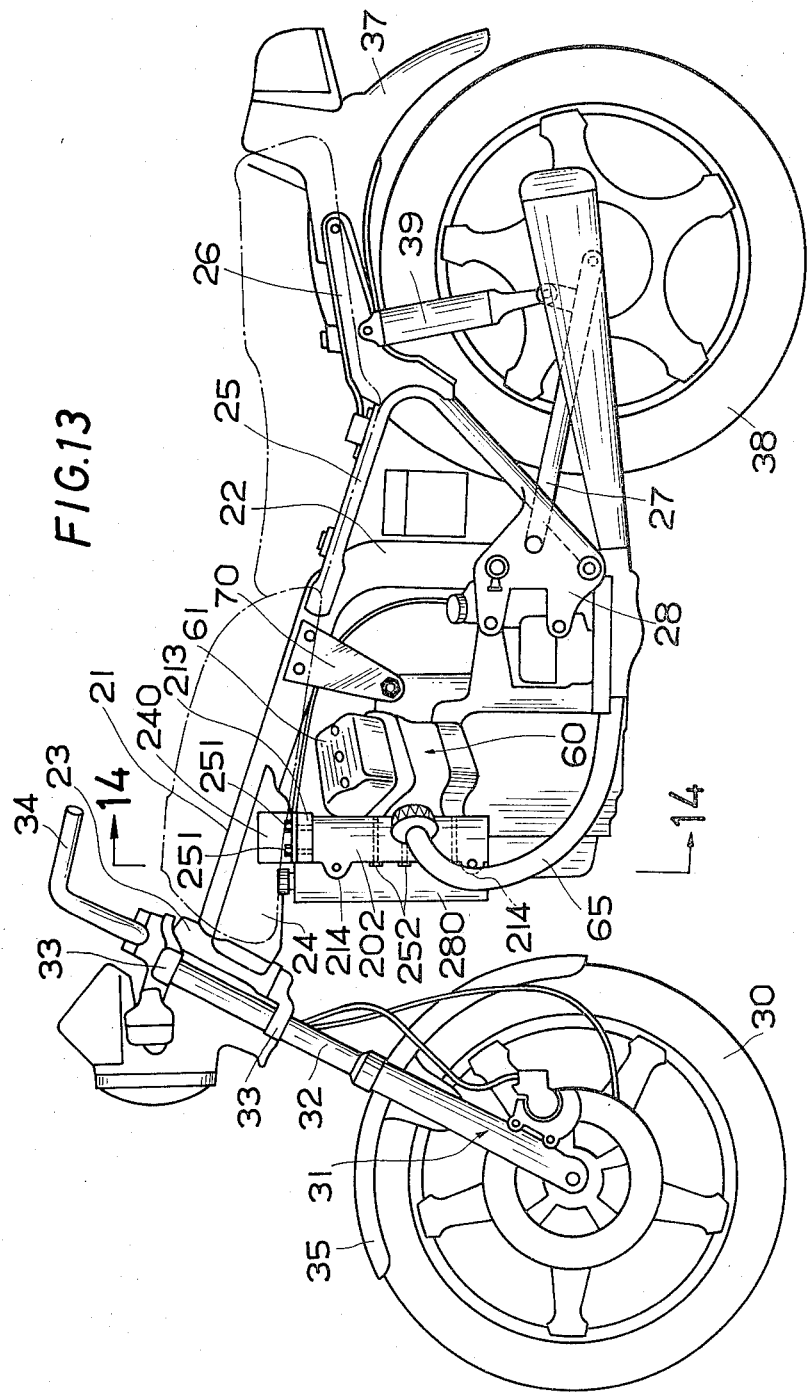
FIG. 13 is a view similar to FIG. 1, showing a modified embodiment of the suspending members.
Figure 14:
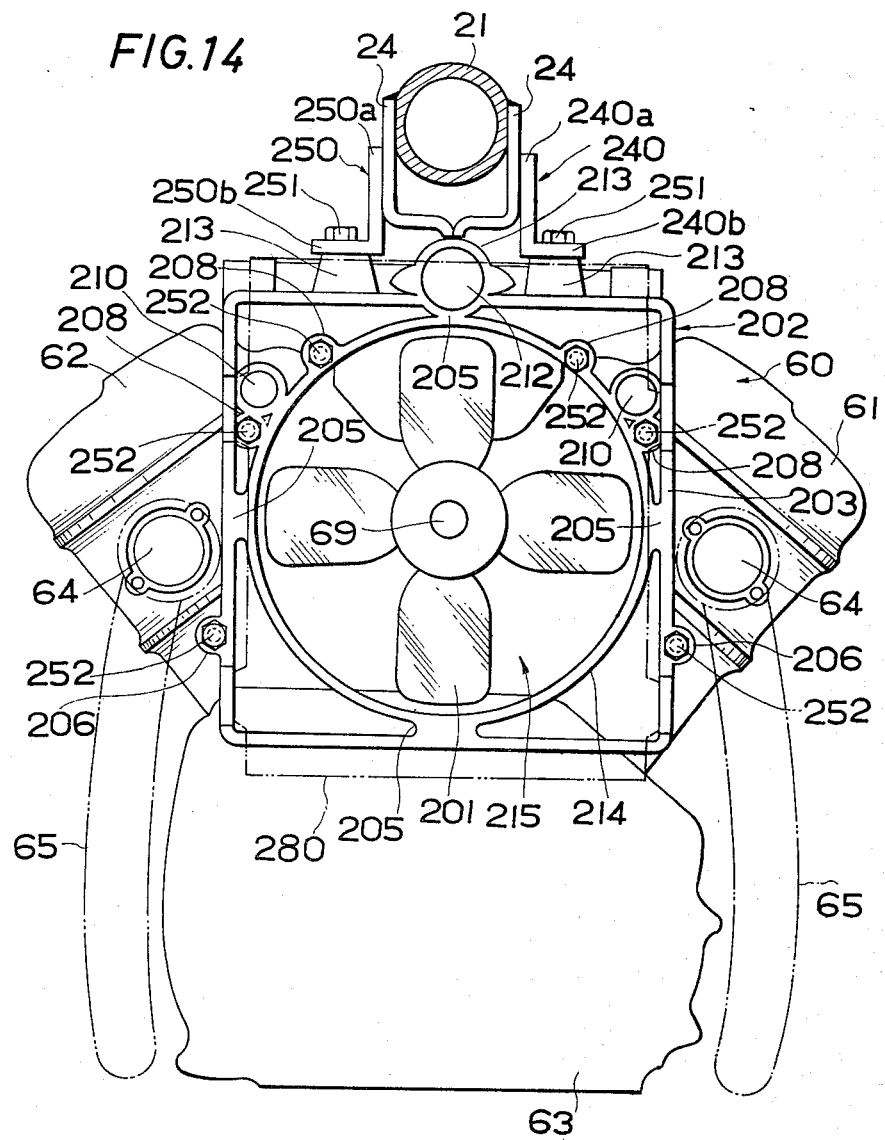
FIG. 14 is a sectional view on line 14—14 in FIG. 13 and is a view similar to FIG. 9 showing a square-shaped fan case.
Figure 15:
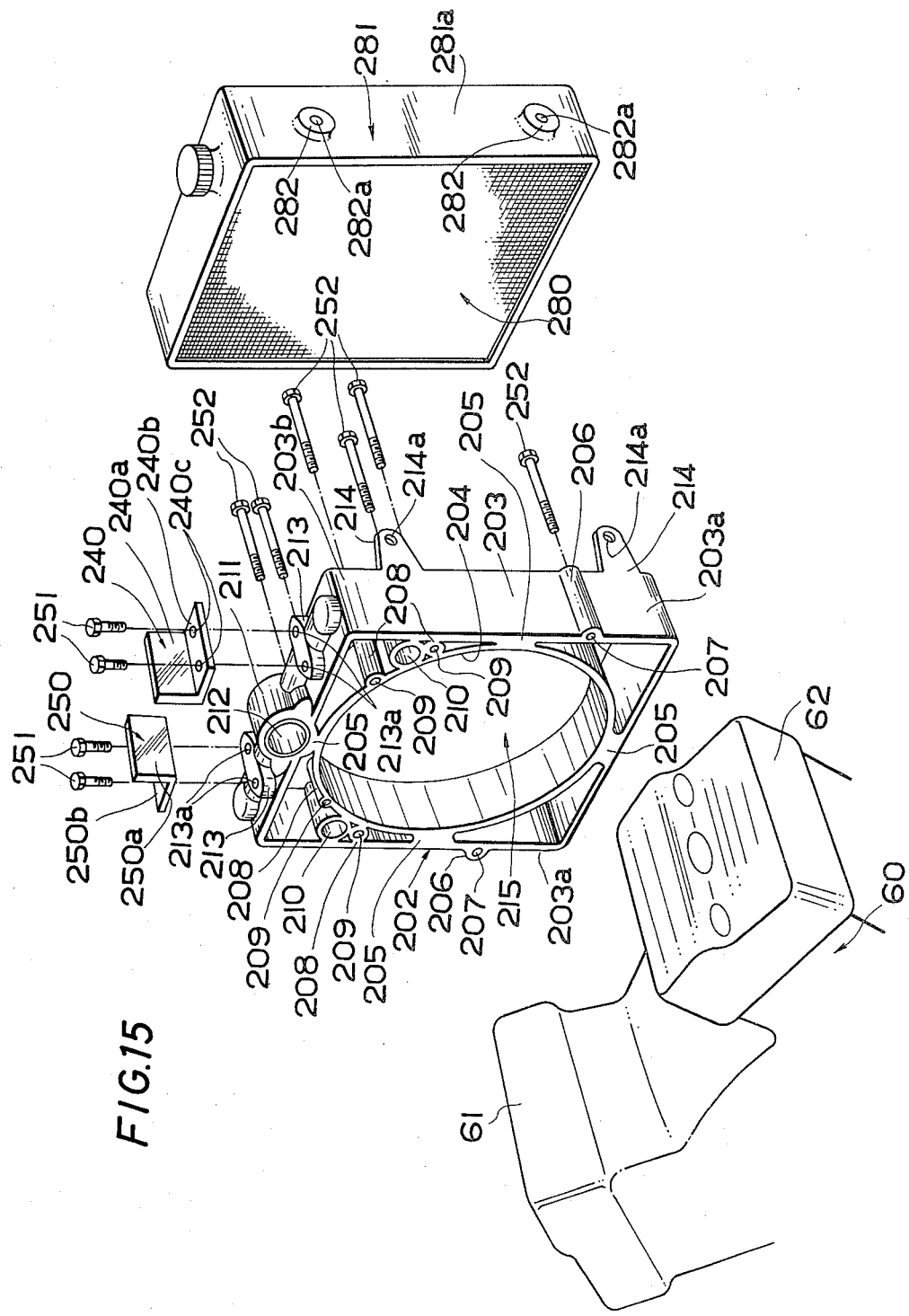
FIG. 15 is an exploded perspective view of a combination of an engine, a square-shaped fan case and a radiator.

FIGS. 11 and 12 schematically show the appearance of a concrete embodiment of a motorcycle to which the present invention is applied.

FIGS. 13 to 17 show modified embodiments of the present invention.

In the illustration, new reference numerals as applied to the modified parts, but the same numerals are used for other like parts similar to those described hereinabove.

The engine 60 is supported by a square shaped fan case suspended by supporting members provided on both sides in the front part of the main frame pipe 21. As clearly shown in FIGS. 14 and 15, the fan case 202 is shaped like a square box which comprises a square frame 203 and a circular fan housing 204 opened in the front and rear on the inside of the frame. The frame 203 and the housing 204 are connected with each other. In the lower parts of both side surfaces 203a of the frame 203, ribs 206 are formed to be extended sidewardly and are provided with bolt passing holes 207 therein in the forward and rearward directions. On the right and left in the upper part of the outer periphery of the annular fan housing 204, the same ribs 208 as the ribs 206 are provided and have bolt passing holes 209 therein. On the outer peripheries on the right and left of the upper part of the housing 204, water passages 210 between the engine 60 and radiator 280 are formed so that one of the passages 210 may be for water exiting and the other may be for water entering.

A swelling 211 is provided in the center on the upper wall 203b of the frame 203 and is hollowed in the forward and rearward directions to form a housing 212 of a thermostat for adjusting the water temperature. Bosses 213 for placing the suspending members 240 and 250 thereon are provided on both sides of the swelling 211. Forward extensions 214 for connecting the radiator 280 are integrally provided above and below on the side walls 203a of the frame 203. The extensions 214 are provided with screw holes 214a.

Substantially L-shaped suspending members 240 and 250 are connected to the joint plates 24 on the main frame pipe 21 at vertical portions 240a and 250a by welding or bolting. The lateral portions 240b and 250b are provided with bolt passing holes 240c and 250c. The bosses 213 provided on the upper wall 203b of the frame 203 are applied below the lateral portions 240b and 250b, and bolts 251 are screwed through the holes 240c and 250c into holes 213a of the bosses 213. The square-shaped fan case 202 is thus connected to the suspending members 240 and 250 so as to be suspended from and fixed to the frame pipe 21 through the members 240 and 250.

The front surface of the engine 60 is arranged on the back surface of the case 202. Connecting bolts 252 are passed through the holes 207 and 209 of the ribs 206 and 208 from the front surface of the case 202 and are screwed into holes (not illustrated) provided on the front surface of the engine 60 to fasten and connect the engine 60 and the case 202 with each other. Thereby, the engine 60 is suspended from the front part of the frame pipe 21 through the suspending members 240 and 250 and the case 202.

Bosses 282 provided with fitting holes 282a are formed above and below on the side walls 281a of the body 281 of the radiator 280 arranged in front of the fan case 202. Before the radiator 280 is attached, the fan 201 is housed in a space 215 enclosed with the annular housing 204 of the case 202 and is connected to the driving shaft 69 of the engine 60. The extensions 214 of the fan case 202 are applied to the bosses 282 of the radiator and are connected by bolting through the fitting holes 214a and 282a. The water passage 210 is connected at one end to a water port (not illustrated) of the radiator 280 and at the other end to a water port of the water jacket (not illustrated) of the engine 60. The assembled state of the respective elements described above is shown in FIGS. 13 and 14.

Thus, in this embodiment, the fan case housing the fan therein is interposed between the suspending members and the engine and supports the engine and radiator thereon.

The respective portions of the square-shaped fan case 202 are all integrally shaped by die-casting of an aluminum alloy. This embodiment has the advantage that the cooler device, accessories and passage can be obtained integrally with the engine supporting members, in addition to the advantages of the previously described embodiment.

The embodiment in FIG. 16 is a further modification, with explanation of the same members as the previous embodiments being omitted.

Rearward extensions 283 are integrally provided above and below on the side walls 281a of the radiator 280. Bosses 216 corresponding to the extensions 283 are provided on the side walls 203a of the engine supporting member 202. Bolts are screwed in the fitting holes 283a and 216a provided in the respective parts 283 and 216 to connect the radiator 280 to the member 202.

FIG. 17 shows a further modified embodiment. Sideward extensions 217 projecting in the side directions are integrally provided in the relatively lower parts of the side walls 203a of the frame 203 of the member 202. Fitting holes 217a are provided above and below in the extensions 217, and the member 202 is connected to the front part of the engine by bolts through the holes 217a.

As described above, according to the modifications of the invention, the water passage and thermostat cover can be attached to the engine supporting member so that minimization of fittings can be attained. Further, because the members are concentrated in one place, the assembly can be made easier. Furthermore, due to the die-casting from aluminum alloy of the square-shaped fan case which serves as an engine supporting member, a sufficient strength and rigidity can be obtained.

We claim:

1. A motorcycle, comprising:
 a head tube;
 a main frame member extending rearwardly from said head tube;
 supporting means suspended from said main frame member adjacent said head tube;
 said supporting means including a square-shaped fan case enclosing a cooling fan;
 an engine connected to the rear side of said square-shaped fan case;
 a radiator connected to the front side of said fan case;
 said fan case being provided with connecting portions for connecting to said supporting means, said engine, and said radiator; and
 said connecting portions of said fan case being integrally shaped by die-casting or the like.

2. A motorcycle according to claim 1, wherein:
 said fan case is provided with a part of a water passage between said engine and said radiator;
 said fan case is further provided with a fitting portion for a thermostat; and
 said water passage part and said thermostat fitting portion of said fan case are integrally cast-shaped.

3. A motorcycle, comprising:
 a head tube;
 a main frame member extending rearwardly from said head tube;
 supporting means suspended from said main frame member adjacent said head tube;
 an engine mounted on said supporting means;
 said supporting means including a pair of supporting plates, said supporting plates being spaced apart from each other in the rightward and leftward directions so as to directly support said engine on both right and left sides in the front part of said engine;
 said supporting means further including reinforcing members disposed between said head tube and the front part of said main frame member, and connected thereto;

said supporting plates being secured to said reinforcing members;
said supporting plates each including an intermediate portion and a lower portion;
said pair of supporting plates being bent diagonally outwardly and downwardly in said intermediate portions thereof and extending substantially vertically downwardly in parallel with each other in said lower portions thereof; and
recesses for receiving fastening means for connecting said supporting plates to said engine being provided in said intermediate portions and said lower portions of said pair of supporting plates.

4. A motorcycle according to claim 3, wherein:
said pair of supporting plates are connected with each other through fastening means at the uppermost ends thereof.

5. A motorcycle according to claim 3, wherein:
said engine comprises a water-cooled engine;
said water-cooled engine is supported on the rear sides of said supporting plates; and
a radiator attached to said engine is supported on the front sides of said supporting plates.

6. A motorcycle according to claim 5, wherein:
said engine comprises a V-shaped vertical multi-cylinder engine; and
said V-shaped vertical multi-cylinder engine is supported in the front parts of two cylinders thereof by said supporting plates.

7. A motorcycle according to claim 6, wherein:
said radiator is provided with a water hose;
said motorcycle further comprises a crankcase; and
said water hose of said radiator is housed in a valley formed between the side surfaces of a cylinder of said V-shaped engine and the side surface of said crankcase.

8. A motorcycle according to claim 5, wherein:
extensions extended rearwardly are provided on both sides of said radiator and are disposed on the side surfaces of said supporting plates so as to attach said radiator to said supporting plates through said extensions.

9. A motorcycle according to claim 5, wherein a cooling fan is provided between said engine and said radiator and in a space enclosed with said supporting plates.

10. A motorcycle according to claim 9, wherein said cooling fan is enclosed within a fan case provided on the outer periphery thereof with radially extended extensions and is connected at said extensions to said supporting plates in common through fastening members for connecting said supporting plates to said engine.

11. A motorcycle according to claim 5, wherein said radiator is provided with a water inlet projected out from the upper end of said radiator and housed in a recess formed on the lower surface of a fuel tank.

12. A motorcycle, comprising:
a head tube;
a main frame member extending rearwardly from said head tube;
supporting means suspended from said main frame member adjacent said head tube;
an engine mounted on said supporting means;
said supporting means including a pair of supporting plates, said supporting plates being spaced apart from each other in the rightward and leftward directions so as to directly support said engine on both right and left sides in the front part of said engine;
said engine comprising a water-cooled engine;
said water-cooled engine being supported on the rear sides of said supporting plates;
a radiator attached to said engine and supported on the front sides of said supporting plates;
said water-cooled engine comprising a V-shaped vertical multi-cylinder engine supported in the front parts of two cylinders thereof by said supporting plates;
said radiator being provided with a water hose;
a crankcase; and
said water hose of said radiator being housed in a valley formed between the side surfaces of a cylinder of said V-shaped engine and the side surface of said crankcase.

13. A motorcycle, comprising:
a head tube;
a main frame member extending rearwardly from said head tube;
supporting means suspended from said main frame member adjacent said head tube;
an engine mounted on said supporting means;
said supporting means including a pair of supporting plates, said supporting plates being spaced apart from each other in the rightward and leftward directions so as to directly support said engine on both right and left sides in the front part of said engine;
said engine comprising a water-cooled engine;
said water-cooled engine being supported on the rear sides of said supporting plates;
a radiator attached to said engine and supported on the front sides of said supporting plates; and
rearwardly-extending extensions provided on both sides of said radiator and disposed on the side surfaces of said supporting plates so as to attach said radiator to said supporting plates through said extensions.

14. A motorcycle, comprising:
a head tube;
a main frame member extending rearwardly from said head tube;
supporting means suspended from said main frame member adjacent said head tube;
an engine mounted on said supporting means;
said supporting means including a pair of supporting plates, said supporting plates being spaced apart from each other in the rightward and leftward directions so as to directly support said engine on both right and left sides in the front part of said engine;
said engine comprising a water-cooled engine;
said water-cooled engine being supported on the rear sides of said supporting plates;
a radiator attached to said engine and supported on the front sides of said supporting plates;
a cooling fan provided between said engine and said radiator in a space enclosed with said supporting plates; and
said cooling fan being enclosed within a fan case provided on the outer periphery thereof with radially-extended extensions and connected at said extensions to said supporting plates in common through fastening members for connecting said supporting plates to said engine.

* * * * *